(12) United States Patent
Gupta et al.

(10) Patent No.: US 10,397,072 B2
(45) Date of Patent: Aug. 27, 2019

(54) SYSTEMS, DEVICES, AND METHODS FOR INCIDENT MANAGEMENT INTERACTIONS

(71) Applicant: Walmart Apollo, LLC, Bentonville, AR (US)

(72) Inventors: Binod Kumar Gupta, Bentonville, AR (US); Richard Boyd Marlar, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 401 days.

(21) Appl. No.: 14/974,714

(22) Filed: Dec. 18, 2015

(65) Prior Publication Data

US 2016/0191339 A1 Jun. 30, 2016

Related U.S. Application Data

(60) Provisional application No. 62/098,680, filed on Dec. 31, 2014.

(51) Int. Cl.
*G06F 15/16* (2006.01)
*H04L 12/24* (2006.01)
*H04L 29/06* (2006.01)

(52) U.S. Cl.
CPC ...... *H04L 41/5074* (2013.01); *H04L 41/0226* (2013.01); *H04L 63/08* (2013.01)

(58) Field of Classification Search
CPC .... H04L 65/102; H04L 63/02; G06F 11/0793; G06F 11/0787

(Continued)

(56) References Cited

U.S. PATENT DOCUMENTS 6,032,184 A 2/2000 Cogger et al.
6,473,407 B1 * 10/2002 Ditmer ................ G06F 11/0709
370/252

(Continued)

OTHER PUBLICATIONS iTrak Core Modules: Incident Reporting and Risk Management Software Solution, Product Description, 9 pages, downloaded from http://www.iviewsystems.com/itrak/itrak-core-modules, accessed on Dec. 16, 2014.

(Continued)

*Primary Examiner* — Duyen M Doan
(74) *Attorney, Agent, or Firm* — McCarter & English, LLP; David R. Burns

(57) ABSTRACT

Provided herein are methodologies, systems, apparatus, and non-transitory computer-readable media for interacting between a service provider system and an enterprise incident management system, that include a gateway device programmed to receive a provider method including processor-executable instructions to perform a task relating to an incident at an enterprise back-end and convert the provider method to be compatible with the incident management system. The conversion is based on a structured framework to convert a method executable in the service provider system to a method executable in the incident management system. The gateway device is also programmed to transmit the converted provider method to a server of the incident management system. The system may include a server programmed to execute the converted provider method to generate a response method and transmit the response method to the gateway device, where the response method includes data relating to performance of the task.

21 Claims, 10 Drawing Sheets

(58) Field of Classification Search
USPC .................................................. 709/223–225
See application file for complete search history.

(56) References Cited

U.S. PATENT DOCUMENTS

| | | | |
|---|---|---|---|
| 13,069,437 | | 11/2011 | Aigner et al. |
| 9,710,122 | B1* | 7/2017 | Pillay ...................... G06F 3/048 |
| 9,715,675 | B2* | 7/2017 | Chakravarty .......... G06Q 10/06 |
| 2001/0056507 | A1 | 12/2001 | Bartkowiak et al. |
| 2003/0154118 | A1* | 8/2003 | Druyan ............ G06Q 10/06311 |
| | | | 705/7.13 |
| 2005/0039192 | A1* | 2/2005 | Chavez, Jr. ............... G06F 1/28 |
| | | | 719/318 |
| 2006/0050684 | A1* | 3/2006 | Bangham ............... G06Q 20/20 |
| | | | 370/352 |
| 2007/0116185 | A1 | 5/2007 | Savoor et al. |
| 2009/0313059 | A1* | 12/2009 | Trivedi .................. G06Q 10/06 |
| | | | 705/301 |
| 2011/0112846 | A1 | 5/2011 | Zhu |
| 2013/0117195 | A1 | 5/2013 | Mohanty et al. |
| 2013/0159427 | A1* | 6/2013 | Jahr ................... H04L 41/5074 |
| | | | 709/206 |
| 2015/0144705 | A1* | 5/2015 | Thiruvengada .......... F24F 11/30 |
| | | | 236/1 C |

OTHER PUBLICATIONS

Web Help Desk: Help Desk Software & IT Asset Management, Feature Details, 11 pages, downloaded from http://www.webhelpdesk.com/help-desk-software/feature-comparison, accessed on Dec. 16, 2014.

* cited by examiner

SYSTEMS, DEVICES, AND METHODS FOR INCIDENT MANAGEMENT INTERACTIONS

RELATED APPLICATIONS

This application claims benefit of and priority to U.S. Provisional Patent Application No. 62/098,680, filed Dec. 31, 2014, which is incorporated herein by reference in its entirety.

TECHNICAL FIELD

The present disclosure relates to incident management within an enterprise system. The present disclosure also relates to methodologies, systems and devices for integrating incident management information between an enterprise system and one or more service provider systems.

BACKGROUND OF THE TECHNOLOGY

In general, incident management within an enterprise may include the creation, updating, and maintenance of incident tickets. Certain existing incident management techniques allow a third party vendor to access an enterprise back end server to create or update incident tickets.

SUMMARY

In accordance with some examples of the present disclosure, a system for executing an interaction between a service provider system and an incident management system is disclosed. The system includes a gateway device programmed to receive a provider method generated at the service provider system and addressed to the incident management system. The provider method includes processor-executable instructions to perform a task relating to one or more incidents at an enterprise back-end of the incident management system. The gateway device is also programmed to create a converted provider method by converting the provider method to be compatible with the incident management system. The conversion is based on a structured framework to convert a method executable in the service provider system to a method executable in the incident management system. The gateway device is also programmed to transmit the converted provider method to at least one server of the incident management system.

In accordance with other examples of the present disclosure, the system for executing the interaction between the service provider system and the incident management system can include the gateway device, programmed as described above, and at least one server. The at least one server can be programmed to execute the converted provider method to generate a response method. The response method includes data relating to performance of the task relating to the one or more incidents. The at least one server is also programmed to transmit the response method to the gateway device.

In other examples, the system described above also includes a DMZ environment that facilitates interaction between the service provider system and the incident management system. The DMZ environment is programmed to receive the provider method from a webservice-based interface, which itself receives the provider method from the service provider system. The DMZ environment is also programmed to authenticate the provider method and, if authenticated, transmit the provider method to a gateway device. The DMZ environment may also be programmed to provide the converted response method to the service provider system using the webservice-based interface. The webservice-based interface may be programmed to communicate with a plurality of different service provider systems concurrently. In such examples, the gateway device may also be programmed to create a proxy webservice corresponding to each one of the plurality of different service provider systems. This may be done, for example, if a given service provider cannot use an existing proxy webservice. The system may also include a first firewall configured to regulate a communication between the webservice-based interface and the DMZ environment, and/or a second firewall configured to regulate a communication between the DMZ environment and the gateway device. The gateway device may be further programmed to authenticate the converted provider method, and executing the converted provider method may include transmitting the authenticated converted provider method to a back-end database of the incident management system.

In another example, the provider method includes processor-executable instructions to perform a task, such as but not limited to, creating an incident ticket relating to at least one of the one or more incidents, retrieving data indicative of information contained in an existing incident ticket relating to at least one of the one or more incidents, updating an existing incident ticket, wherein the update provides an indication of a status of work performed relating to at least one of the one or more incidents, performing a query relating to at least one of the one or more incidents, retrieving results of a previous query relating to at least one of the one or more incidents, re-assigning an incident ticket relating to at least one of the one or more incidents, or creating a work log for an existing incident ticket.

In another example, the response method includes processor-executable instructions to perform a task, such as but not limited to, provide an indication of the creation of an incident ticket relating to at least one of the one or more incidents, provide data indicative of ticket information in an existing incident ticket relating to at least one of the one or more incidents, provide data indicative of updated ticket information indicative of an updated status of an existing incident ticket, provide data indicative of results of at least one query relating to at least one of the one or more incidents, provide an indication of a re-assignment of an incident ticket relating to at least one of the one or more incidents, or provide an indication of the creation of a work log for an existing incident ticket.

The gateway device may also be programmed to convert the response method based on the structured framework such that the converted response method is executable at the service provider system.

In accordance with other examples of the present disclosure, a system for facilitating an interaction between a service provider and an incident management system is disclosed. The system includes at least one server programmed to receive, at the incident management system, data indicative of an incident at an enterprise back-end of the incident management system. The server is also programmed to generate an incident ticket corresponding to the incident. The system also includes a gateway device programmed to receive a provider method generated at the service provider system (and addressed to the incident management system) that includes processor-executable instructions to perform a task relating to the incident. The gateway device may also be programmed to convert the provider method to be compatible with the incident management system. The provider method conversion is based on a structured framework for converting a method executable in the service provider system to a method executable in the incident management system. The gateway device may also be programmed to transmit the converted provider method to at least one server of the incident management system, which is programmed to execute the converted provider method to update the incident ticket to provide an updated incident ticket. The server of the incident management system is also programmed to generate a response method including an indication of the updated incident ticket, and transmit the response method to the gateway device.

In some examples, the system described above also includes a DMZ environment that facilitates interaction between the service provider system and the incident management system. The DMZ environment is programmed to receive, from a webservice-based interface, the provider method. The webservice-based interface receives the provider method from the service provider system. The DMZ environment is also programmed to authenticate the provider method and, if authenticated, transmit the provider method to the gateway device. In some examples, the system also includes a first firewall configured to regulate a communication between the webservice-based interface and the DMZ environment, and/or a second firewall configured to regulate a communication between the DMZ environment and the gateway device. The webservice-based interface may also be programmed to communicate with a plurality of different service provider systems concurrently. In such cases, the gateway device may be further programmed to create a proxy webservice corresponding to each one of the plurality of different service provider systems. This may be done, for example, if a given service provider cannot use an existing proxy webservice. The provider method may include processor-executable instructions to update the incident ticket to provide an indication of a status of work performed relating to the incident. The response method may also include processor-executable instructions to provide data indicative of the updated incident ticket. The gateway device may be further programmed to convert the response method based on the structured framework such that the converted response method is executable at the service provider system. The webservice-based interface may also be programmed to provide the converted response method to the service provider system. In yet another example, the gateway device is programmed to authenticate the converted provider method, and executing the converted provider method involves transmitting the authenticated converted provider method to a back-end database of the incident management system.

Any combination or permutation of the above examples is envisioned.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments when read together with the accompanying drawings, in which.

DETAILED DESCRIPTION

Figure 1A:
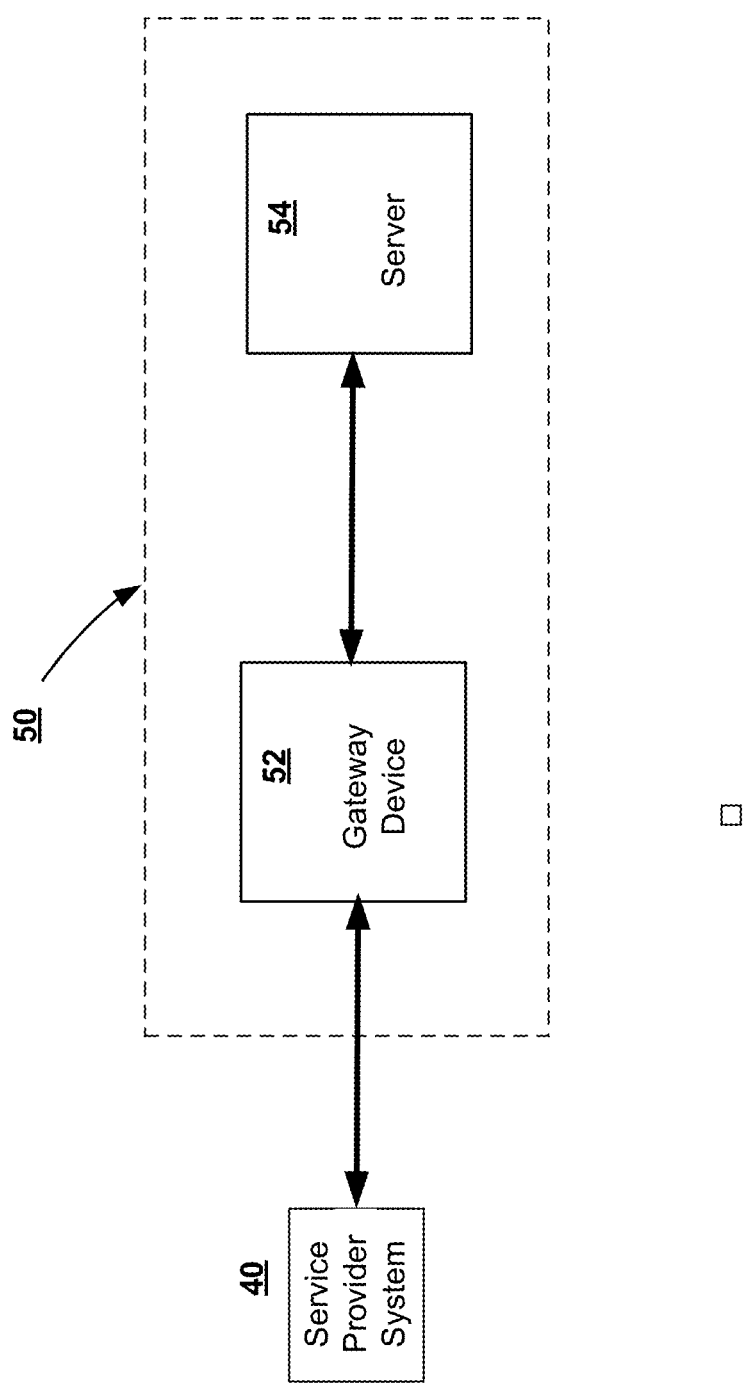
FIG. 1A is a block diagram of an example system that can perform example processes, according to the principles of the present disclosure.

Following below are more detailed descriptions of various concepts related to, and embodiments of, inventive methods, apparatus, and systems for executing an interaction between a service provider system and an incident management system using a structured framework. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

Example methodologies, systems, apparatus, and non-transitory computer-readable media are described herein to facilitate an interaction between a service provider system and an incident management system in connection with one or more incidents at an enterprise back-end. An example enterprise back-end includes software applications (and other applications), hardware (including one or more servers and one or more databases) and machine readable instructions executable thereon, that facilitate collaboration and communication across an organization, collection of data, and provides for accessibility across one or more (including multiple) departments of an organization. As defined herein, an incident can be any occurrence in the enterprise back-end that is not part of the normal operation of the enterprise back-end and that can cause an interruption to or a reduction in the quality of services in the enterprise back-end. An incident management system facilitates allocation of resources to address these incidents, including to return the affected area(s) of the enterprise back-end to normal operation.

In an example, the incident can be a temporary occurrence, including a short-lived or time-limited occurrence that can be self-correcting after a certain period of time.

In another example, the incident can be a longer-lived occurrence or permanent occurrence, such as but not limited to component or equipment failure, infected software, or corrupted software, that is not self-correcting.

In an example, the incident report can be generated based on an anticipated incident or reasonably expected incident. Such an incident ticket can be generated based on an occurrence expected in that near future, such as but not limited to an expected event that may cause failure of a portion of the network, a piece of equipment, or a component, as part of an alert. Non-limited examples of such expected events include an online sale (including a holiday sale), coverage of a sporting event, and coverage of an awards show.

In another example, if a user is not able to perform a task, such as a task relating to a device, an application, or some other type of equipment that communicates with the enterprise back-end, the user may report the issue to an information technology (IT) helpdesk that generates an incident. As a non-limiting example, if a debit or credit card reader device is not functioning at a store point of sale, a user may call the IT helpdesk to create an incident ticket based on this incident.

The incident management system can be configured to generate incident tickets for these incidents and to assign one or more of these incident tickets to a service provider, along with the responsibility for addressing these incidents. As used herein, the term "service provider" encompasses "vendors." As non-limiting examples, an incident ticket can include one or more of the following data about the incident: (i) the type of non-normal occurrence in the enterprise back-end, (ii) the software application (or other application) affected, (iii) a ranking or other indicator of the severity of the non-normal occurrence, (iv) a description of the failure, (v) incident date, (vi) incident status (e.g., such as but not limited to open, closed, or deferred), (vii) the identity of the service provider assigned to the ticket, (viii) an indication of the service provider's acceptance of the incident ticket (including date of acceptance), (ix) the date the service provider commences performing the work to address the incident, (x) the date the service provider completes the work to address the incident, (xi) whether the incident ticket is being re-assigned to a different service provider, and (xii) a serial number or other classifier assigned to the incident ticket. The incident management system also can be configured to allow the service provider to update the data associated with the incident ticket as the service provider performs the work to address the incident and/or completes the work. Data from one or more of these incident tickets can be analyzed, e.g., using an analytics module, for reporting and/or for analysis of the performance of the service provider. The incident management system can be configured to run queries of the incident management tickets to extract this data.

In some existing systems, the incident ticket may be generated in an incident management system as a text file. Interactions between the service provider's system and the incident management system are facilitated through successive exchange of the incident ticket text file(s) between each service provider's system and the incident management system. This can become inefficient and prone to inaccuracy.

Some other existing incident management systems involving multiple service providers can become increasingly complex and unwieldy if an enterprise's interactions with each individual service provider needs to be tailored to the specific methods and protocols used by the system of each individual service provider. For example, in order for the methods of each service provider to function within an enterprise's incident management system, integration codes for each service provider may need to be written. These integration codes may then need to be re-written and/or updated if a vendor is changed, a vendor is added, or if the enterprise chooses to replace or update its own enterprise back-end systems.

Provided herein are example methodologies, systems, apparatus, and non-transitory computer-readable media for executing an interaction between a service provider system and an enterprise incident management system. Based on the example methodologies, systems, apparatus, and non-transitory computer-readable media herein, the service provider's system can be maintained decoupled from an enterprise's incident management system through use of a structured framework. The structured framework facilitates the interactions between the service provider's system and the enterprise's incident management system. An example structured framework herein specifies a conversion protocol that transforms a method executable in the service provider system to a method executable in the incident management system. The conversion protocol facilitates transformation and re-formatting (including revising the command structure ordering) of executable code and data structures of the service provider method to provide a converted provider method that is executable in the incident management system to generate output targeted by the provider method. The conversion protocol specifies the manner in which the executable code and data structures of the provider method is to be transformed and re-formatted to provide the converted provider method, based on the types of parameters and commands in the service provider method, and the type of data structures that the service provider expects to return as a result from execution of the provider method. The converted provider method includes processor-executable instructions that are executable in the incident management system to generate the data output targeted by the provider method.

FIG. 1A is a block diagram that illustrates an example system 50 that can be used to provide decoupled interaction between a service provider system 40 and an incident management system within an enterprise. Example system 50 includes a gateway device 52 programmed to receive the provider method generated at the service provider system and addressed to the incident management system. The provider method includes processor-executable instructions to perform a task relating to one or more incidents at an enterprise back-end. The gateway device is also programmed to parse the provider method to determine the executable code and data structures included therein, convert the provider method to provide a converted provider method that is compatible with the incident management system based on the structured framework described herein, and transmit the converted provider method to at least one server 54 of the incident management system. The at least one server 54 is programmed to execute the converted provider method to generate a response method that includes data relating to performance of the task relating to the one or more incidents, and transmit the response method to the gateway device.

As non-limiting examples, the result of performance of the task can be a return of any of the data associated with the incident ticket, such as but not limited to: (i) the type of non-normal occurrence in the enterprise back-end, (ii) the software application (or other application) affected, (iii) a ranking or other indicator of the severity of the non-normal occurrence, (iv) a description of the failure, (v) incident date, (vi) incident status (e.g., such as but not limited to open, closed, or deferred), (vii) the identity of the service provider assigned to the ticket, (viii) an indication of the service provider's acceptance of the incident ticket (including date of acceptance), (ix) the date the service provider commences performing the work to address the incident, (x) the date the service provider completes the work to address the incident, (xi) whether the incident ticket is being re-assigned to a different service provider, and (xii) a serial number or other classifier assigned to the incident ticket. As another non-limiting example, the result of performance of the task can be an update of the data associated with the incident ticket. As yet another non-limiting example, the result of performance of the task can be execution of a query of the incident management system concerning two or more incidents, including a query for data associated with the two or more incidents. As another non-limiting example, the result of performance of the task can be the initiation of a new incident ticket by a provider method generated by the service provider system.

In an example, the gateway device is programmed to automatically execute the conversion tool according to the structured framework on receipt of the provider method addressed to the incident management system.

Using the example middleware component of the methodologies, systems, apparatus, and non-transitory computer-readable media herein, the service provider system can be maintained decoupled from the incident management system. That is, an incident management system (including a ticketing system) that would otherwise not interact properly interact with a service provider system, may interact through the structured framework. As a result, no modification is required to be made to the incident management system if new service providers are added, existing service providers are discontinued, or existing service providers change their system. In addition, modifications can be made to the incident management system without affecting service provider interactions. This can increase the efficiency of the incident management system and handling of enterprise back-end incident tickets, reduce complexity for operation and maintenance of the incident management system and the enterprise back-end. This also can provide for increased security of the incident management system and the enterprise back-end.

As another example, the methodologies, systems, apparatus, and non-transitory computer-readable media facilitate execution of the interaction between the service provider system and the enterprise incident management system through the use of a webservice proxy, along with the structured framework. The provider methods can be sent to the webservice proxy through a demilitarized zone (DMZ) environment. The provider method can be authenticated in the DMZ environment prior to being sent to the gateway device. The gateway device is programmed to follow the structured framework described herein when building the converted provider methods. The authenticated provider methods are converted at the gateway device using the structured framework into a format that is readable and executable at the enterprise's back-end incident management system, without allowing service providers access to that back-end system. An additional benefit of the decoupled incident management systems is the ability to provide increased security through the authentication of service provider methods at a DMZ environment and at the webservice proxy.

Accordingly, through application of the structure or rules provided by the structures framework of an internal webservice as described herein, a service provider system can be implemented to build a provider method that can be converted into a converted method that is readable and executable by the incident management system of the enterprise back-end. In other words, a service provider may interact with an enterprise's internal incident management system through the webservice proxy without knowing or having access to the specific names and/or protocols used at the enterprise back-end. Thus, an incident management system (including a ticketing system) that would otherwise not interact properly interact with a service provider system, may interact through the webservice conversion techniques described herein. Such a decoupled system provides increased security, provides a uniform framework for interacting with various service providers, and allows for efficient replacement or modification of internal incident management systems without affecting service provider interactions.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

Example systems, devices, methods, and non-transitory computer-readable media can be used to facilitate interaction between a service provider and an incident management system. An internal incident management system may be decoupled from an incident management or ticketing system used by a service provider by hosting a webservice proxy that acts as a middle-man between one or more service providers and an internal incident management system. This webservice proxy may be hosted on an internal network device and may provide a specific structure or format that service providers must follow when building their methods. Thus, a specifically formatted service provider method may be provided to the web service proxy, which is authenticated and converted into a method that may be read and executed by an internal incident management system at an enterprise back-end.

Figure 1B:
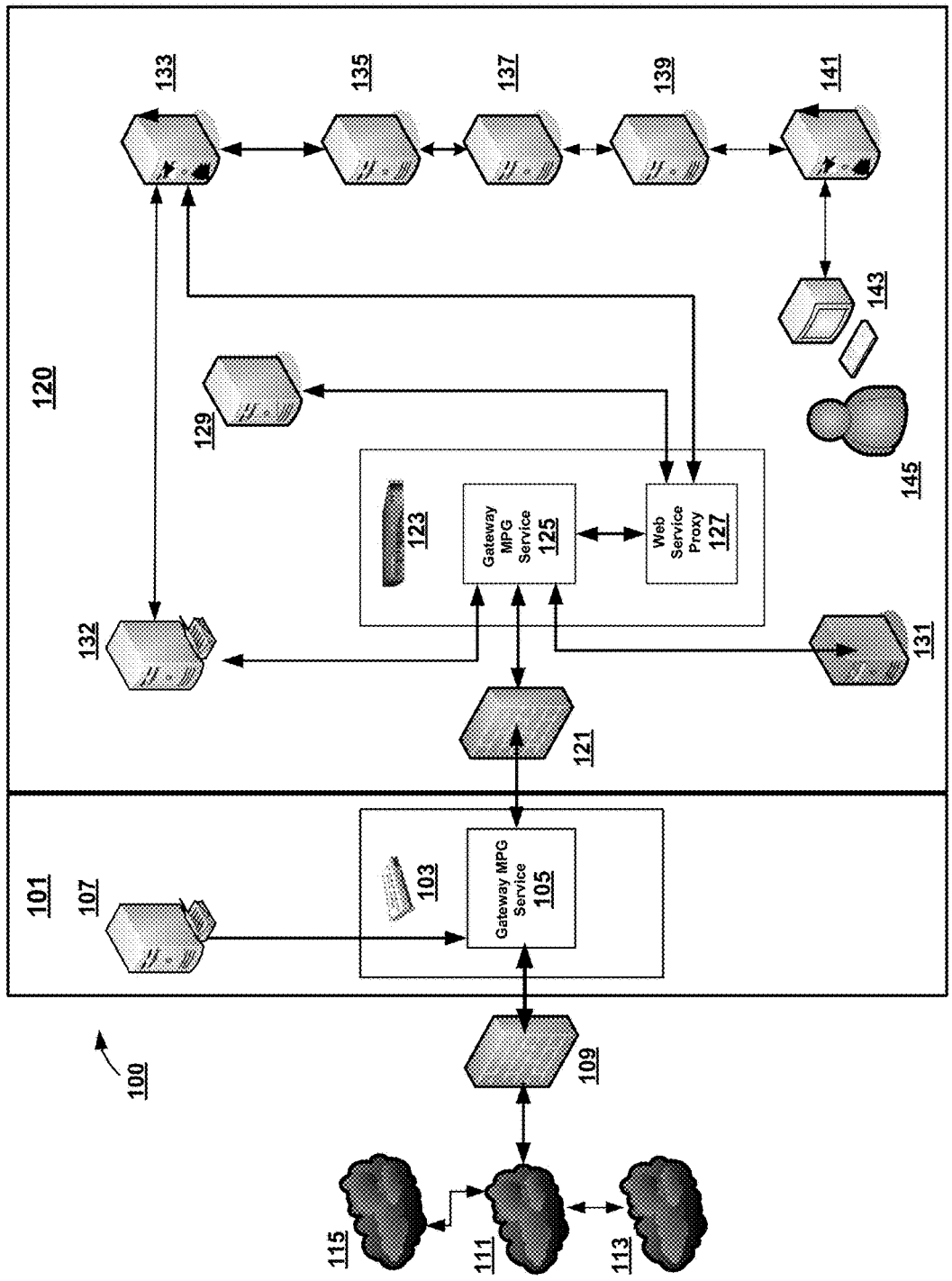
FIG. 1B is a block diagram of another example system that can perform example processes, according to the principles of the present disclosure.

FIG. 1B is a block diagram that illustrates another example system 100 that can be used to provide decoupled interaction between a service provider system and an incident management system within an enterprise. The example system 100 may be used to perform any of the example methods disclosed herein. Specifically, the system 100 may include a DMZ environment 101 for exposing the enterprise's outward-facing services to vendors and/or service providers. The DMZ environment, in this particular example, includes DMZ network device 103 and gateway MPG (multi-protocol gateway) service 105. In a non-limiting example, the DMZ network device 103 can be, but is not limited to, an IBM XS45 DATAPOWER® network device (IBM Corporation, New York). A first service provider 113 and a second service provider 115 may communicate with the DMZ gateway MPG service 105 via a webservice-based interface 111. In some embodiments, communications, such as but not limited to service provider methods, from service providers 113 and 115 must pass through a firewall 109 before accessing the DMZ network device 103. The firewall 109 may be configured to regulate communication between the webservice-based interface 111 and the DMZ environment 101. Once within the DMZ environment 101, a service provider method sent from a service provider system is authenticated at the DMZ active directory 107. In one particular example, the service provider method includes processor-executable instructions to perform a task relating to one or more incidents at an enterprise back-end of the incident management system. The communications from the service providers 113 and 115 and the DMZ environment 101 may be, for example, a simple object access protocol (SOAP) message over HTTPS, or any other suitable message protocol.

In some embodiments, the service provider method must conform to a structured framework, provided by the enterprise incident management system. This structured framework may include, for example, a security header with a username and password that may be used to perform the DMZ authentication at active directory 107. The framework may also require that the service provider include a second username and password that may be used at an additional authentication stage within the enterprise's internal environment 120. In some embodiments, once the DMZ authentication has been performed, the original security header provided in the service provider method may be removed, and the rest of the service provider method may be transmitted to the internal environment 120. Users internal to the enterprise may bypass the DMZ environment 101, in some embodiments, and access the internal environment 120 via an internal application server 131.

Once authenticated within the DMZ environment 101, the service provider method may pass to the enterprise's internal environment 120, through a second firewall 121, and reach the internal gateway MPG service 125 located within an internal gateway device 123. As described herein, the gateway device 123 can include at least one component programmed to convert the provider method to be compatible with the incident management system to provide the converted provider method, based on a structured framework that converts a method executable in the service provider system to a method executable in the incident management system. Firewall 121 may be configured to regulate communication between the DMZ environment 101 and the internal gateway device 123. In a non-limiting example, the internal gateway device 123 may be an IBM XI50 DATAPOWER® network device (IBM Corporation, New York). A second authentication is performed at an internal active directory 132 within the enterprise's internal environment 120, using the second username and password provided in the service provider method. Once the internal authentication has been performed at the internal active directory 132, the service provider method is ready to be converted into an enterprise-readable format. The internal gateway device 123, in this particular embodiment, also includes a webservice proxy 127, which is in communication with a registry and repository 129, such as but not limited to an IBM WEBSPHERE® Service Registry (IBM Corporation, New York). The webservice proxy 127 is hosted within the enterprise's internal environment so that the vendor method may interface with the webservice proxy, rather than the enterprise back-end system. The enterprise back-end, in this embodiment, includes a server 141, in communication with a portal 143 that may be used by internal users 145 to access the incident management system application server 139 and database server 137. Internal users 145 may access the portal 143 using a graphical browser, such as but not limited to, an INTERNET EXPLORER® graphical browser (Microsoft Corporation, WA), CHROME® graphical browser (Google Inc, CA), FIREFOX® (Mozilla Corporation, CA), or SAFARI® (Apple Inc., CA). The enterprise back end further includes an additional application server 135 and an internal back-end server 133, in communication with database server 137, that can execute all or portions of the enterprise's internal ticketing or incident management system.

In a non-limiting example, the internal back-end server 133 is the same as server 141, which is a web server that hosts the incident management web application or webservice. Similarly, in another non-limiting example, application server 135 is the same as the application server 139, which is an application server that hosts the incident management application and the business logic. Servers 133, 135, and 137 may form part of an integration environment, whereas servers 141, 139, and 137 form part of a non-integration or user-facing environment which may be accessed by a user, such as but not limited to an enterprise associates or employees.

The internal incident management system running on the enterprise back-end at server 133 is decoupled from any external service provider system via the webservice proxy 127 and the internal gateway device 123, such that the service providers 113 and 115 do not have access to the system running on the back-end server 133. Thus, in order to execute a service provider method within the internal environment 120, the service provider method must first be converted into a format that is readable by the server 133. This conversion is performed using at the internal gateway device 123, in this particular embodiment. As discussed above, the service provider method that is sent from service providers 113 and 115 must conform to a structured framework provided by the enterprise. This structured framework includes, in some embodiments, a proxy URL provided by the enterprise that connects the service providers 113 and 115 to a web proxy hosted at the webservice proxy 127. In some embodiments, multiple webservice proxies may be hosted at a single time such that different service providers may interact with their own webservice proxy. Thus, an enterprise may receive methods from various service providers via the web proxies before execution of those methods at the enterprise back-end. In some embodiments, a webservice-based interface may be programmed to communicate with a plurality of different service provider systems concurrently. In other embodiments, the internal gateway device 123 may create a proxy webservice corresponding to each one of a plurality of different service provider systems. This may be done, for example, if a given service provider cannot use an existing proxy webservice.

In addition to the proxy URL, the service provider method may also provide a subscription and user identification (ID)

that identifies that particular service provider. In an non-limiting example, each service provider may be issued at least two user IDs. One of the user IDs may be used for authentication in the DMZ environment while the other user ID may be used for authentication in the internal environment against the internal active directory 132. The subscription may include, for example, a consumer ID and a subscription ID. In such an example, a service provider may be issued a consumer ID that is unique to that service provider, as well as a subscription ID that is unique to a function or method in a webservice proxy. For example, the same function or method in a webservice proxy can have a different subscription ID for each different service provider. The subscription and user ID can be used by the internal gateway device 123 to retrieve the enterprise URL for accessing the enterprise back end webservice hosted at the back-end server 133. The enterprise URL may be retrieved, in some embodiments, from the registry and repository 129, which is in communication with the internal gateway device 123 via the webservice proxy 127. The service provider method is then converted to be compatible with the incident management system, and the converted provider method is sent to the enterprise URL within the enterprise incident management system for execution. The conversion process may include a conversion of various protocols within a given method, in some embodiments. Thus, a service provider method must be authenticated twice and converted into an enterprise-readable format before reaching the back-end enterprise webservice hosted at the back-end server 133. In some embodiments, once the method is received at the back-end server 133, the converted provider method may again be authenticated against the internal active directory 132 prior to execution.

Once the converted provider method is executed at the enterprise back-end, a response is built and sent to the internal gateway device 123, where it is converted into a format that the service provider can understand. This converted response is then sent back to the service provider via the DMZ environment 101.

In some embodiments, service provider methods may include processor-executable instructions to perform various tasks. Such tasks may include, for example, creating an incident ticket relating to one or more incidents, retrieving data indicative of information contained in an existing incident ticket, updating an existing incident ticket, providing an indication of the status of work performed relating to an incident, performing a query relating to an incident, retrieving results of a previous query relating to an incident, re-assigning an incident ticket relating to an incident, or creating a work log for an existing incident ticket. The response that is built and sent back to the service provider may include, in some embodiments, processor-executable instructions to provide an indication of the creation of an incident ticket relating to one or more incidents, provide data indicative of ticket information in an existing incident ticket, provide data indicative of updated ticket information indicative of an updated status of an existing incident ticket, provide data indicative of results of at least one query relating to at least one incident, provide an indication of a re-assignment of an incident ticket, or provide an indication of the creation of a work log for an existing incident ticket.

In one specific embodiment, the service provider method includes processor-executable instructions to create or generate an incident ticket relating to one or more incidents. In such an embodiment, the enterprise provides a structured framework or skeleton to the service provider, and the service provider must build a method around this framework. The framework may request information about an incident, such as but not limited to "type" or "node." However, this information will not map exactly to the information used at the enterprise back-end. For example, the service provider input corresponding to "node" may correspond to "location" within the enterprise back-end incident management system, and therefore the method must be converted to an enterprise-readable format at the internal gateway device 123. The rules or framework for converting a service provider method into a method that may be read and executed by the enterprise back-end server 133 may be stored, for example, at the internal gateway device 123 or the registry and repository 129, which is in communication with the webservice proxy 127. Once the service provider method is converted, the proxy URL provided to the service provider may be replaced with the enterprise URL, and the converted provider method may be executed at the enterprise back-end.

Figure 2A:
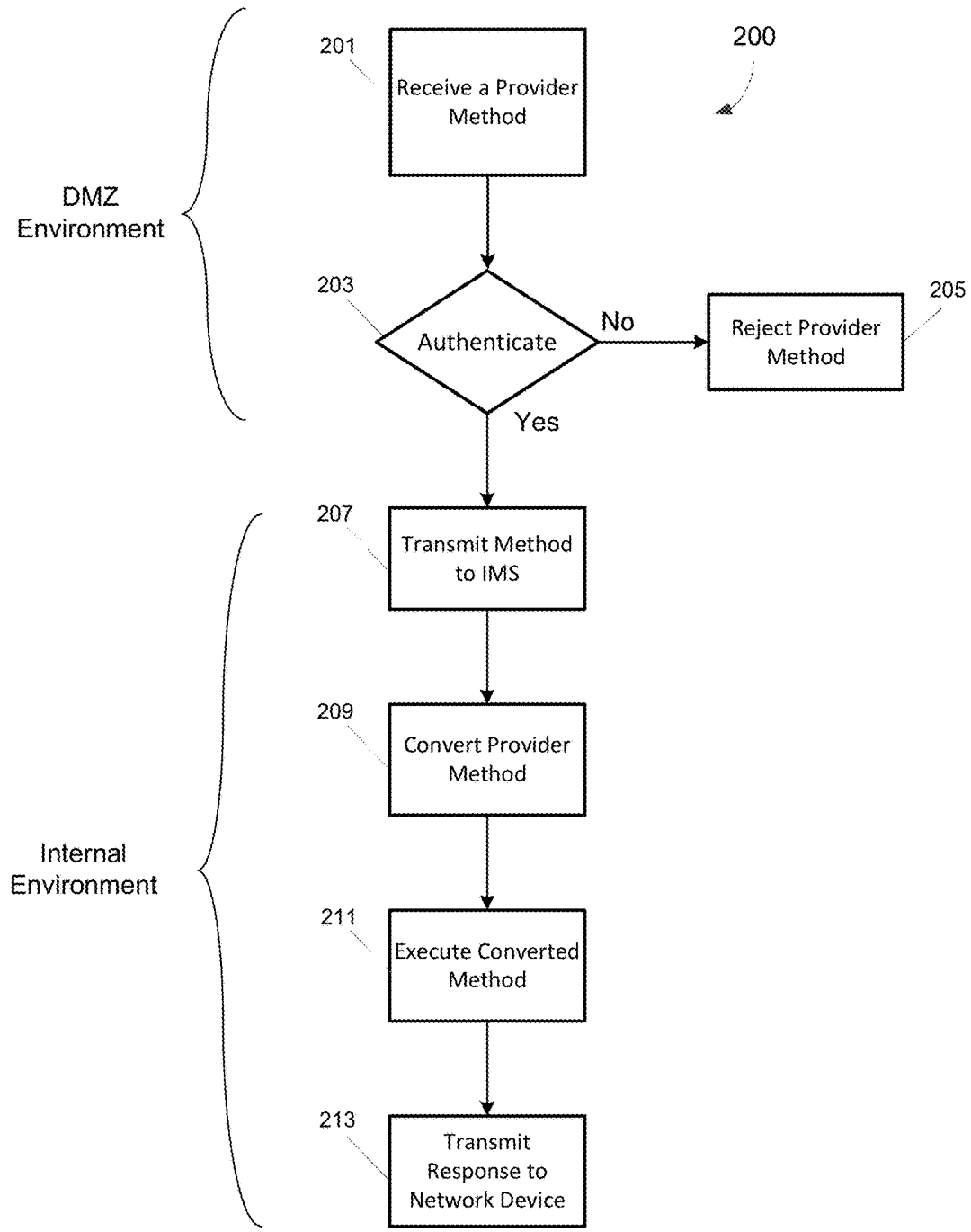
FIG. 2A is a flowchart illustrating an example method for interacting between a service provider and an incident management system, according to the principles of the present disclosure.

FIG. 2A is a flowchart illustrating an example method 200 for interacting between a service provider and an incident management system, according to embodiments of the present disclosure. In step 201, a service provider method is received from a service provider system at a DMZ environment. The provider method is received from the service provider system via a webservice-based interface, and the provider method includes processor-executable instructions for performing a task relating to one or more incidents at an enterprise back-end of an incident management system. Such tasks may include, for example, creating an incident ticket relating to one or more incidents, retrieving data indicative of information contained in an existing incident ticket, updating an existing incident ticket, providing an indication of the status of work performed relating to an incident, performing a query relating to an incident, retrieving results of a previous query relating to an incident, re-assigning an incident ticket relating to an incident, or creating a work log for an existing incident ticket.

In step 203, the service provider method is authenticated using, for example, a username and password included within a security header of the service provider method. If the service provider method does not pass authentication, the method is rejected at step 205. However, if the service provider method passes authentication, the service provider method is transmitted to a network device of the incident management system (IMS) at step 207. Steps 201 through 205 are performed at the DMZ environment, as discussed above in reference to FIG. 1B, prior to reaching the enterprise internal environment. This initial authentication provides increased security to the back-end incident management system.

Once the service provider method has been transmitted to the incident management system at step 207, step 209 converts the provider method into an enterprise-readable format. In one embodiment, the conversion is based on a structured framework, provided by the network device to a service provider, that allows the conversion of a method executable in the service provider system into a method executable in the enterprise's internal incident management system.

In step 211, the converted provider vendor method is executed at a server that is programmed to execute the converted provider method and generate a response method. In some embodiments, executing the converted provider method includes transmitting the authenticated converted provider method to a back-end database of the enterprise back-end. The response method may include data relating to the performance of a task relating to one or more incidents. In some embodiments, the response may include processor-executable instructions to provide an indication of the creation of an incident ticket relating to one or more incidents, provide data indicative of ticket information in an existing incident ticket, provide data indicative of updated ticket information indicative of an updated status of an existing incident ticket, provide data indicative of results of at least one query relating to at least one of the one or more incidents, provide an indication of a re-assignment of an incident ticket, or provide an indication of the creation of a work log for an existing incident ticket. In step 213, the response method is transmitted to the network device, which may then transmit the response to a service provider system via a DMZ environment, in some embodiments.

Figure 2B:
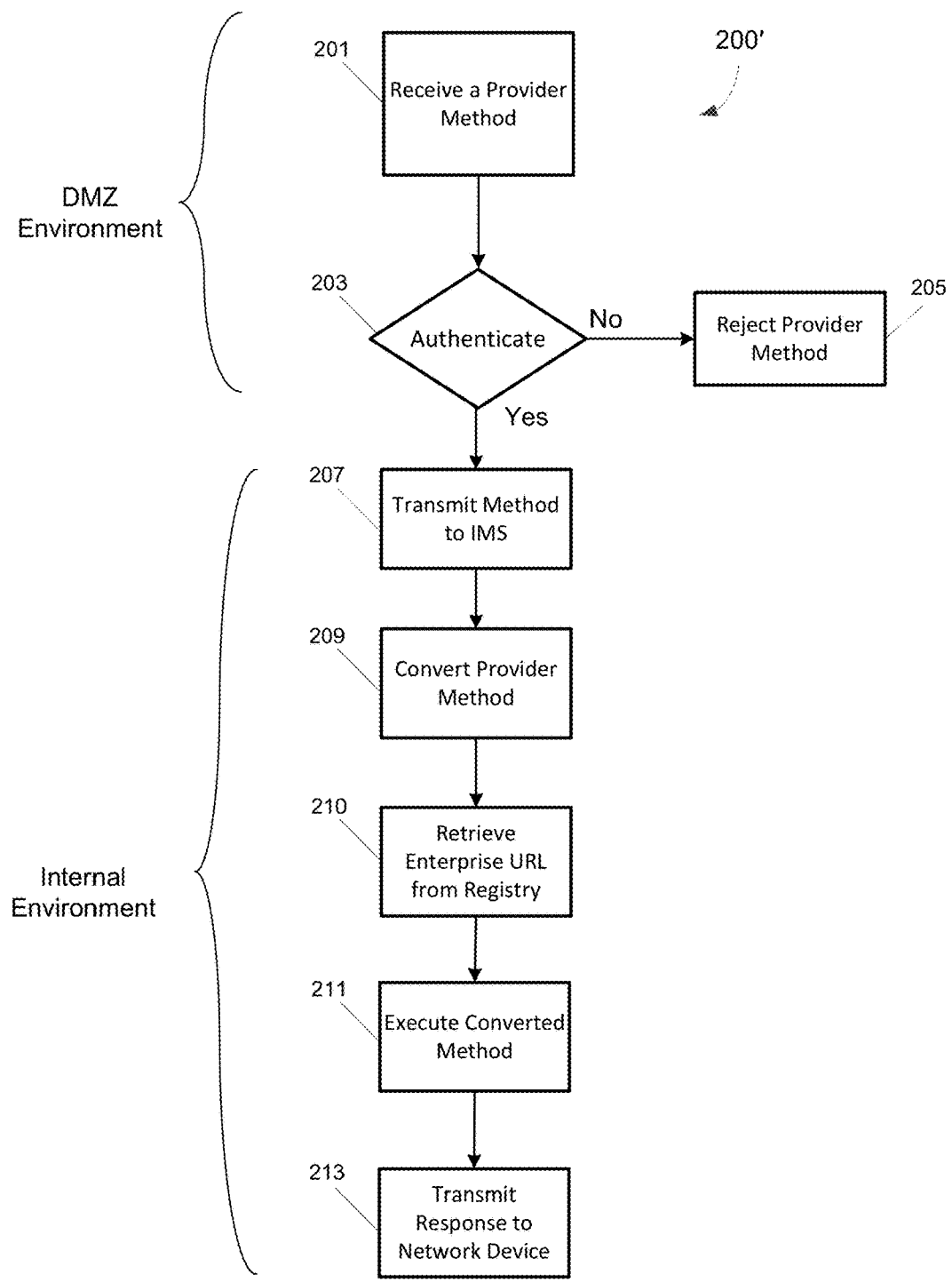
FIG. 2B is a flowchart illustrating an example method for interacting between a service provider and an incident management system, according to the principles of the present disclosure.

FIG. 2B is a flowchart illustrating another example method 200' for interacting between a service provider and an incident management system, according to embodiments of the present disclosure. Features and elements shown in FIG. 2B with the same reference numerals as those shown in FIG. 2A are understood to be similar features and elements that function in similar ways. However, as can be seen in FIG. 2B, after the provider method is converted in step 209 into an enterprise-readable format, an enterprise URL is retrieved from a registry at step 210. This enterprise URL is based on a user and subscription ID that is provided to each service provider. Once the enterprise URL is retrieved, the converted provider method is executed at a server within the incident management system at step 211.

Figure 3A:
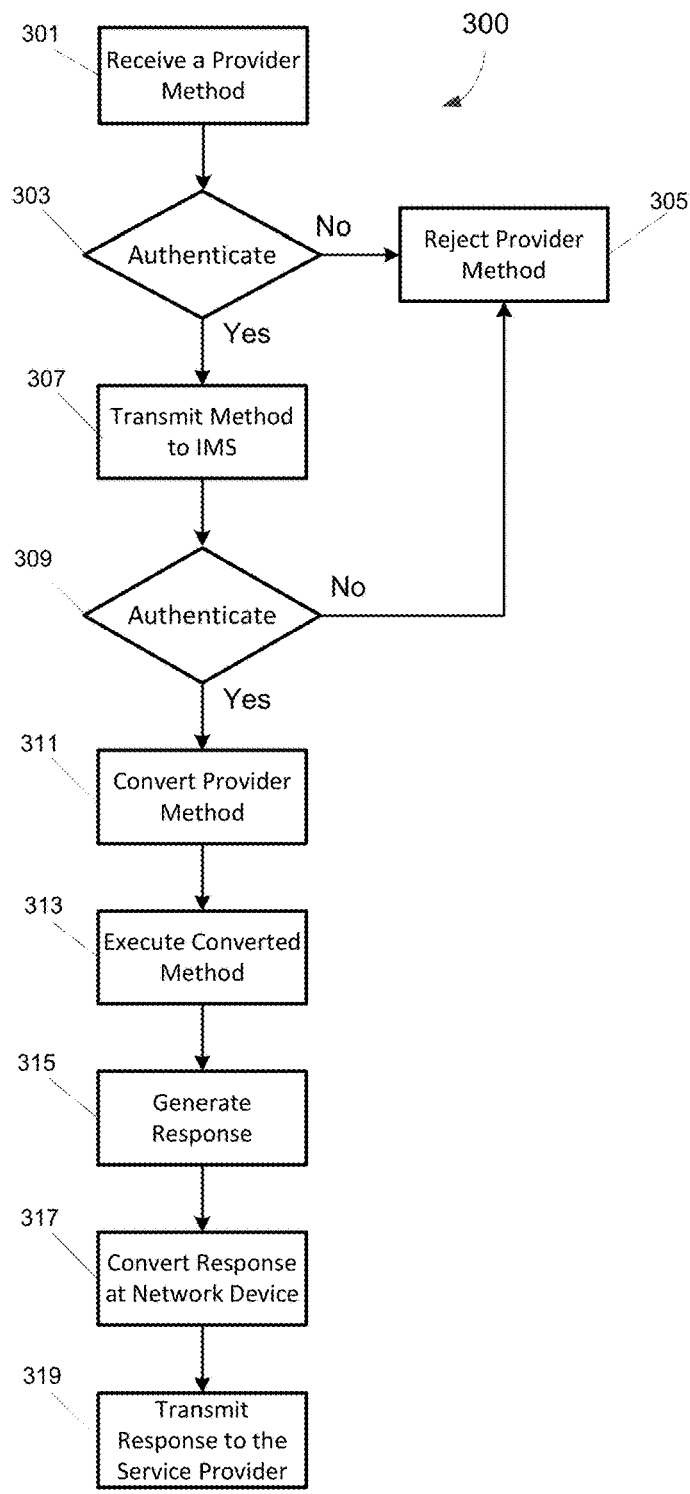
FIG. 3A is a flowchart illustrating another example method for interacting between a service provider and an incident management system, according to the principles of the present disclosure.

FIG. 3A is a flowchart illustrating an example method 300 for interacting between a service provider and an incident management system, according to other embodiments of the present disclosure. In step 301, a service provider method is received from a service provider system at a DMZ environment. The provider method is received from the service provider system from a webservice-based interface, and the provider method includes processor-executable instructions for performing a task relating to one or more incidents at an enterprise back-end of an incident management system. Such tasks may include, for example, creating an incident ticket relating to one or more incidents, retrieving data indicative of information contained in an existing incident ticket, updating an existing incident ticket, providing an indication of the status of work performed relating to an incident, performing a query relating to an incident, retrieving results of a previous query relating to an incident, re-assigning an incident ticket relating to an incident, or creating a work log for an existing incident ticket.

In step 303, the service provider method is authenticated using, for example, a username and password included within a security header of the service provider method. If the service provider method does not pass authentication, the method is rejected at step 305. However, if the service provider method passes authentication, the service provider method is transmitted to a network device of the incident management system (IMS) at step 307. Steps 301 through 305 are performed at the DMZ environment, as discussed above in reference to FIG. 1B, prior to reaching the enterprise internal environment. This initial authentication provides increased security to the back-end incident management system.

Once the service provider method has been transmitted to the incident management system at step 307, step 309 performs an additional authentication within the internal enterprise environment. If this second authentication does not pass, the method may be rejected 305. However, if the service provider method passes the second authentication step 309, the method is converted at step 311 into an enterprise-readable format. In one embodiment, the conversion is based on a structured framework, provided by the network device to a service provider, that allows the conversion of a method executable in the service provider system into a method executable in the enterprise's internal incident management system.

In step 312, the converted provider vendor method is executed at a server that is programmed to execute the converted provider method. Once executed, the server generates a response method at step 315. The response method may include data relating to the performance of a task relating to one or more incidents. In some embodiments, the response may include processor-executable instructions to provide an indication of the creation of an incident ticket relating to one or more incidents, provide data indicative of ticket information in an existing incident ticket, provide data indicative of updated ticket information indicative of an updated status of an existing incident ticket, provide data indicative of results of at least one query relating to at least one of the one or more incidents, provide an indication of a re-assignment of an incident ticket, or provide an indication of the creation of a work log for an existing incident ticket.

In step 317, the response method is converted at the network device into a method that is executable at the service provider system. Once converted into a method that is executable at the service provider system, the converted response method may be transmitted to the service provider system at step 319 using, for example, a webservice-based interface.

Figure 3B:
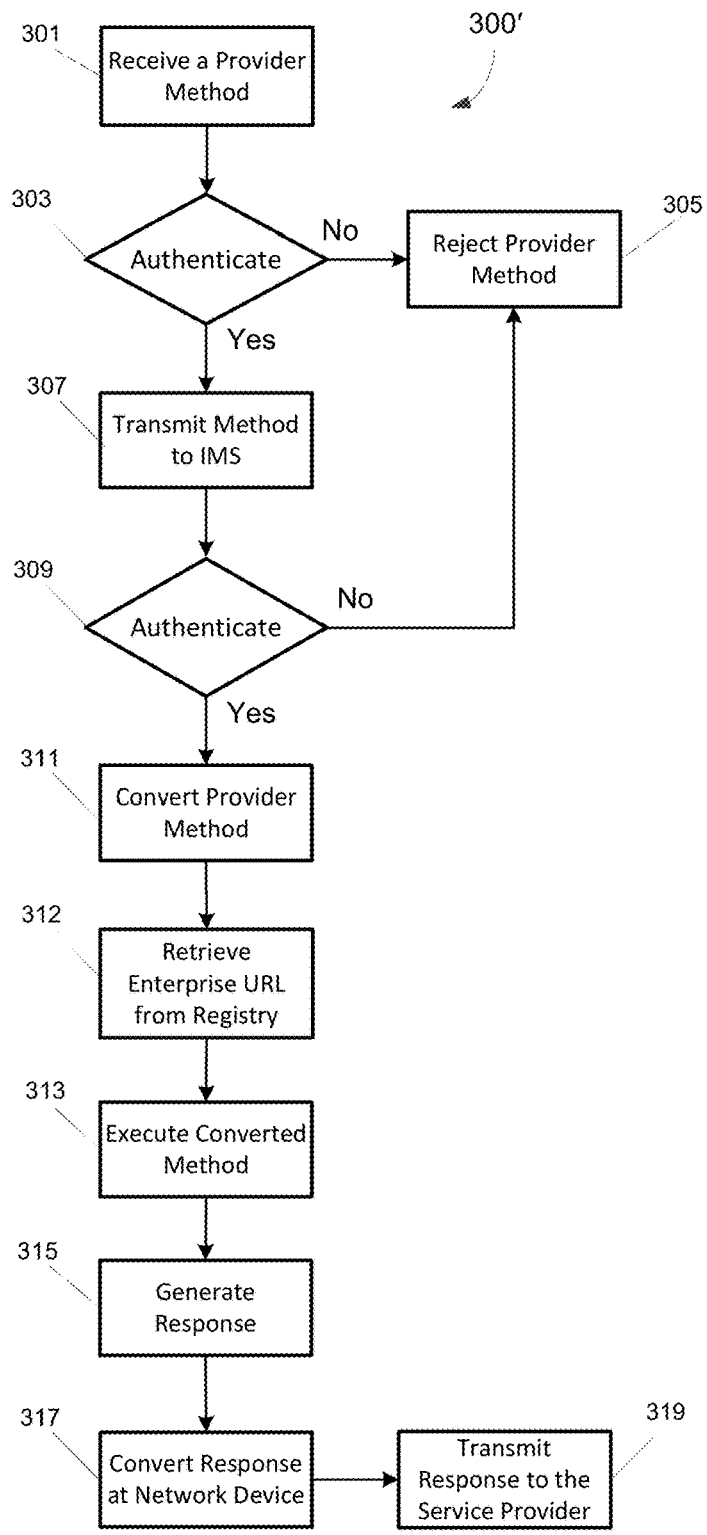
FIG. 3B is a flowchart illustrating another example method for interacting between a service provider and an incident management system, according to the principles of the present disclosure.

FIG. 3B is a flowchart illustrating another example method 300' for interacting between a service provider and an incident management system, according to embodiments of the present disclosure. Features and elements shown in FIG. 3B with the same reference numerals as those shown in FIG. 3A are understood to be similar features and elements that function in similar ways. However, as can be seen in FIG. 3B, after the provider method is converted in step 311 into an enterprise-readable format, an enterprise URL is retrieved from a registry at step 312. This enterprise URL is based on a consumer ID and subscription ID that is provided to each service provider. Once the enterprise URL is retrieved, the converted provider method is executed at a server within the incident management system at step 313.

Figure 4A:
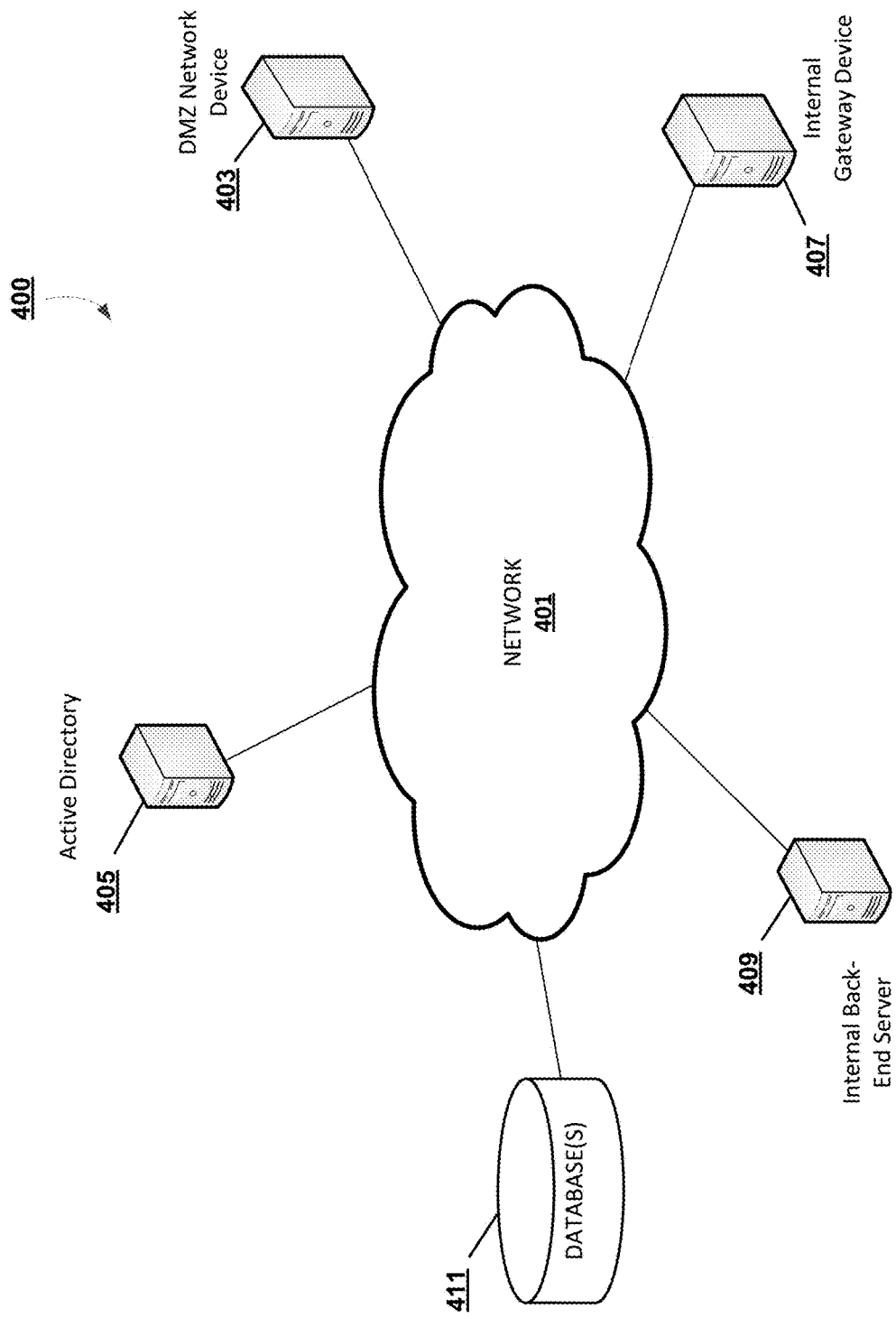
FIG. 4A is a diagram of an example network environment that can be used for a distributed implementation, according to the principles of the present disclosure.

FIG. 4A is a diagram of an example network environment 400 suitable for a distributed implementation of example embodiments. The network environment 400 can include a DMZ network device 403 that can provide an initial authentication, as described above, of any service provider methods transmitted from one or more service providers over a webservice-based interface. The network environment 400 may also include one or more active directories 405, for performing authentication. The network environment may also include an internal gateway device 407 for hosting a webservice proxy, one or more internal back-end servers 409, and one or more internal back-end databases 411, or other elements described in reference to FIG. 1B above. As will be appreciated, various distributed or centralized configurations may be implemented. In example embodiments, the DMZ network device 403, internal gateway device 407, active directory 405, internal back-end server 409, database 411, and any other elements, may be in communication with each other via a communication network 401. The communication network 401 may include, but is not limited to, the Internet, an intranet, a LAN (Local Area Network), a WAN (Wide Area Network), a MAN (Metropolitan Area Network), a wireless network, an optical network, and the like. One or more service providers may interact through the DMZ network device 403 and communicate a service provider method to the internal gateway device 407, where the service provider method is converted into a format that can be read by the internal back-end server 409, as described above.

Figure 4B:
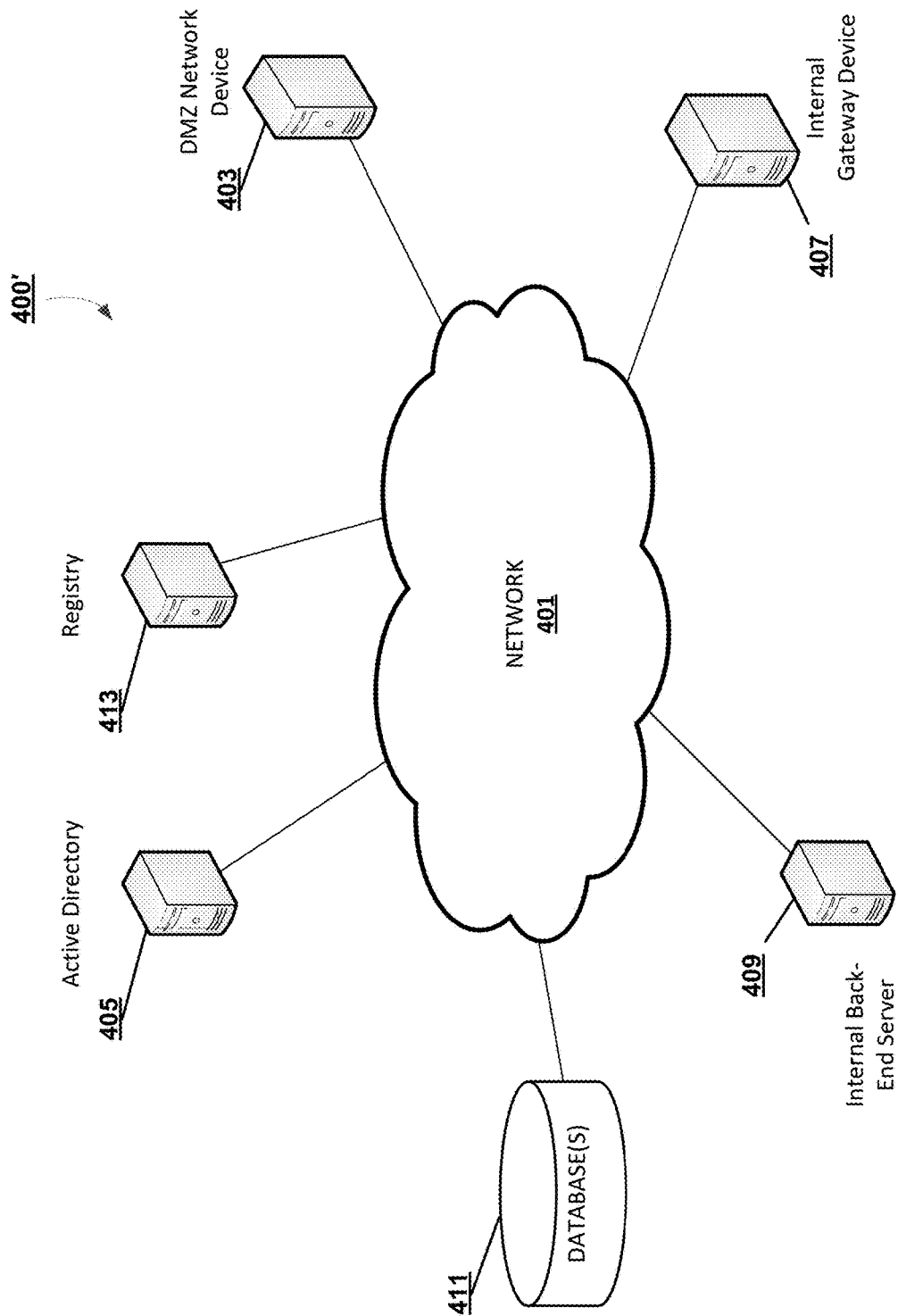
FIG. 4B is a diagram of an example network environment that can be used for a distributed implementation, according to the principles of the present disclosure.

FIG. 4B is a diagram of another example network environment 400' suitable for a distributed implementation of example embodiments. Features and elements shown in FIG. 4B with the same reference numerals as those shown in FIG. 4A are understood to be similar features and elements that function in similar ways. However, as can be seen in FIG. 4B, the network environment may also include a registry and repository 413, such as an IBM WEBSPHERE® Service Registry (IBM Corporation, New York) from which the internal gateway device 407 may retrieve an enterprise URL. The enterprise URL may be retrieved based on, for example, a consumer ID and subscription ID that is provided to each service provider.

Figure 5A:
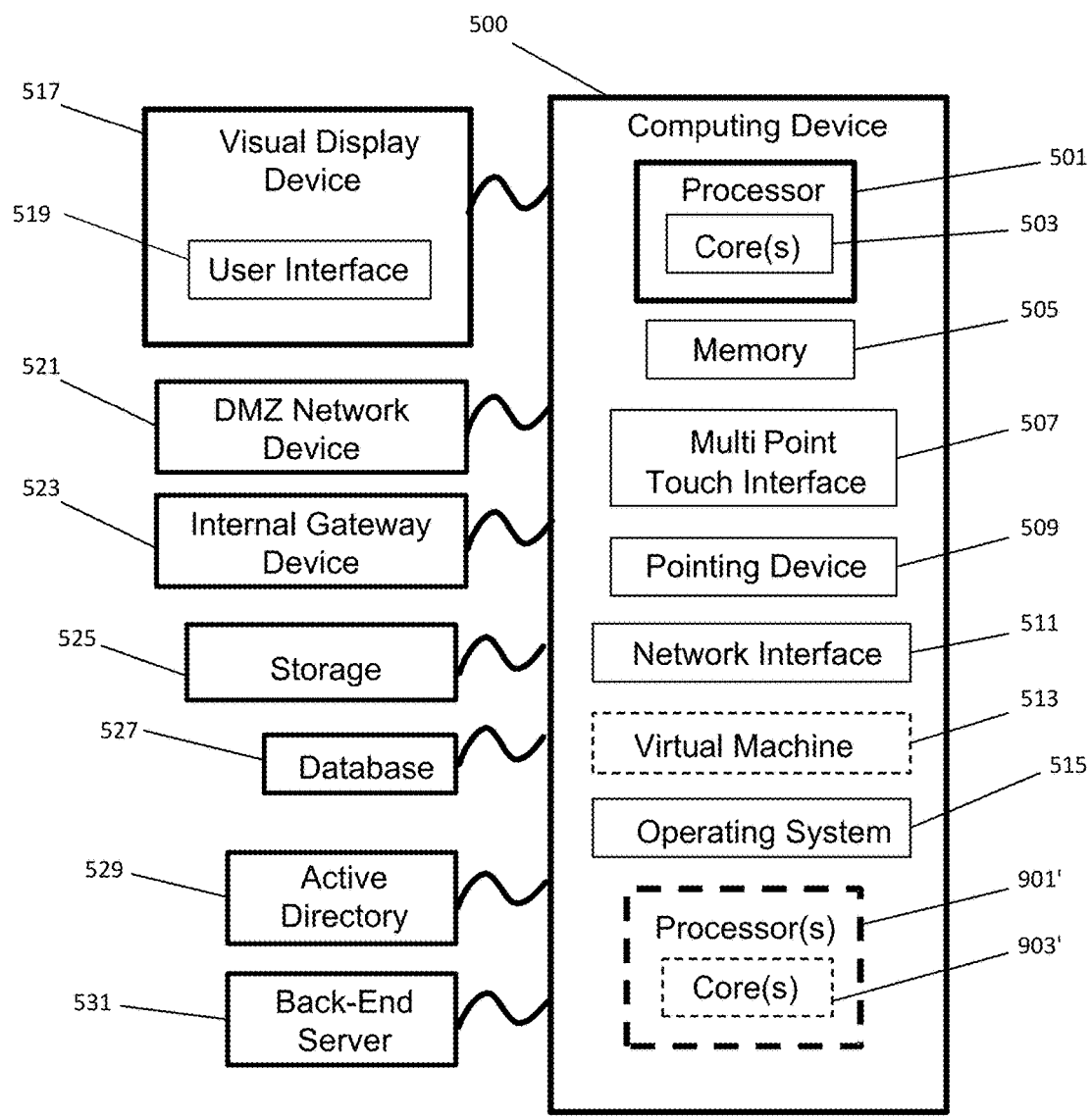
FIG. 5A is a block diagram of an example computing device that can be used in the performance of any of the methods, according to the principles of the present disclosure.

FIG. 5A is a block diagram of an example computing device 500 that can be used in the performance of any of the example methods according to the principles described herein. The computing device 500 includes one or more non-transitory computer-readable media for storing one or more processor-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like. For example, memory 505 included in the computing device 500 can be used to store processor-readable and processor-executable instructions for implementing example implementations. The computing device 500 also includes processor 501 and associated core 503, and optionally, one or more additional processor(s) 501' and associated core(s) 503' (for example, in the case of computer systems having multiple processors/cores), for executing processor-readable and processor-executable instructions (such as but not limited to software or firmware) stored in the memory 505 and other programs for controlling system hardware. Processor 501 and processor(s) 501' can each be a single core processor or multiple core (503 and 503') processor.

Virtualization can be employed in the computing device 500 so that infrastructure and resources in the computing device can be shared dynamically. A virtual machine 513 can be provided to handle a process running on multiple processors so that the process appears to be using only one computing resource rather than multiple computing resources. Multiple virtual machines can also be used with one processor.

Memory 505 can include a computer system memory or random access memory, such as but not limited to DRAM, SRAM, EDO RAM, and the like. Memory 505 can include other types of memory as well, or combinations thereof.

A user can interact with the computing device 500 through a visual display device 517, such as but not limited to a touch screen display or computer monitor, which can display one or more user interfaces 519 that can be provided in accordance with the principles described herein. The visual display device 517 can also display other aspects, elements and/or information or data associated with example implementations, for example, incident ticket information, incident status reports, service provider information, and the like. The computing device 500 can include other I/O devices for receiving input from a user, for example, a keyboard or any suitable multi-point touch interface 507, a pointing device 509 (e.g., a pen, stylus, mouse, or trackpad). The keyboard 507 and the pointing device 509 can be coupled to the visual display device 517. The computing device 500 can include other suitable conventional I/O peripherals.

The computing device 500 can run any operating system 515, such as but not limited to any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In an example, the operating system 515 can be run in native mode or emulated mode. In an example, the operating system 515 can be run on one or more cloud machine instances.

The computing device 500 can also include one or more storage devices 525, such as but not limited to a hard-drive, CD-ROM, or other computer readable media, for storing data and processor-readable instructions (including software or firmware), such as but not limited to one or more enterprise back-end databases 527 that implement an example of the incident management system as taught herein, or portions thereof. The databases can be updated by a user or automatically at any suitable time to add, delete or update one or more items in the databases.

The computing device 500 can include a network interface 511 configured to interface via one or more network device 521 and a gateway device 523 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 511 can include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 can be any computer system, such as but not limited to a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein. In one embodiment, the DMZ network device 521 may be configured, as described above, to provide a DMZ environment for initial authentication of service provider methods transmitted from one or more service providers. In such embodiments, the active directory 529 may be used as the authentication directory. Computing device 500 may also be in communication with an internal gateway device 523 that may be configured to host a web proxy service, as well as to convert an authenticated service provider method into a format that is readable at the enterprise back end server 531. The back-end server 531 that may be configured to host a back-end webservice that can, along with the back-end database 527, execute the incident management methods disclosed herein, or portions thereof.

Figure 5B:
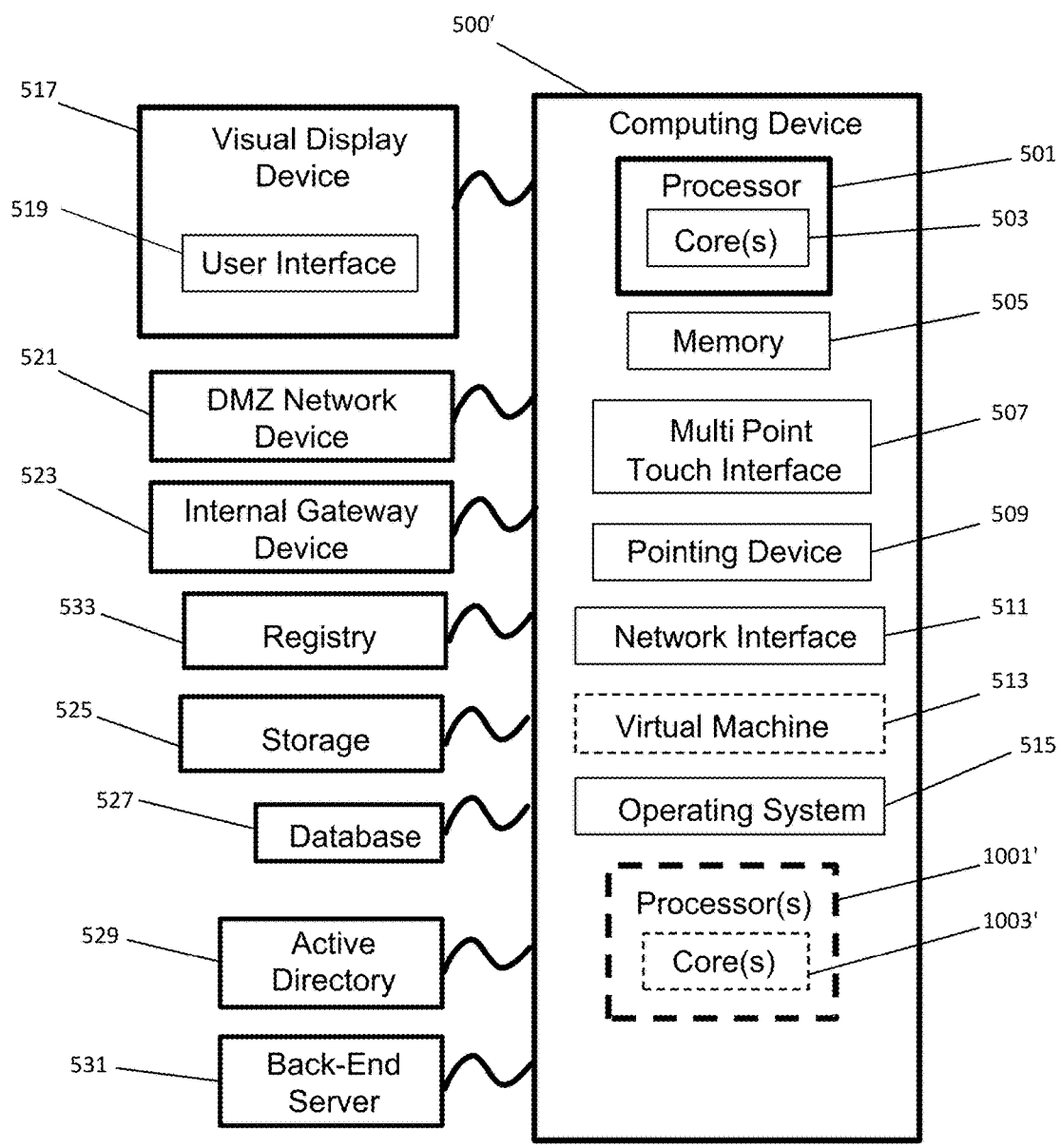
FIG. 5B is a block diagram of an example computing device that can be used in the performance of any of the methods, according to the principles of the present disclosure.

FIG. 5B is a block diagram of another example computing device 500' that can be used in the performance of any of the example methods according to the principles described herein. Features and elements shown in FIG. 5B with the same reference numerals as those shown in FIG. 5A are understood to be similar features and elements that function in similar ways. However, as can be seen in FIG. 5B, the computing device 502 may also be in communication with a registry and repository 533, such as an IBM WEBSPHERE® Service Registry (IBM Corporation, New York) from which the internal gateway device 523 may retrieve an enterprise URL. The enterprise URL may be retrieved based on, for example, a consumer and subscription ID that is provided to each service provider.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A system for executing an interaction between a plurality of different service provider system and an incident management system, the system comprising:
   at least one server programmed to:
   receive, at the incident management system, data indicative of an incident at an enterprise back-end of the incident management system; and generate an incident ticket corresponding to the incident;
   a webservice-based interface programmed to communicate with the plurality of different service provider systems concurrently; and
   a gateway device programmed to:
   receive a provider method generated at one of the plurality of different service provider system and addressed to the incident management system, the provider method conforming with a set of rules specified for the incident management system and comprising processor-executable instructions to perform a task relating to the incident;
   parse the provider method to determine executable code and data structures included therein;
   convert the provider method to be compatible with the incident management system, to provide a converted provider method; wherein the conversion is based on a structured framework to convert a method executable in the service provider system to be processed as a method executable in the incident management system; and
   wherein the structured framework specifies a conversion protocol for transforming and re-formatting of the executable code and the data structures of the provider method to provide a converted provider method executable in the incident management system to generate data output targeted by the provider method; and
   transmit the converted provider method to the at least one server of the incident management system;
   receive a response method from the at least one server of the incident management system;
   wherein the at least one server is further programmed to:
   execute the converted provider method to update the incident ticket to provide an updated incident ticket;
   generate the response method, wherein the response method when executed provides an indication of the updated incident ticket;
   transmit the response method to the gateway device; and
   wherein the gateway device is further programmed to create a proxy webservice corresponding to each service provider system of the plurality of different service provider systems.

2. The system of claim 1, further comprising a DMZ environment that facilitates interaction between the service provider system and the incident management system, the DMZ environment being programmed to:
   receive, from the webservice-based interface, the provider method;
   wherein the webservice-based interface receives the provider method from the service provider system;
   authenticate the service provider system transmitting the provider method; and
   if authenticated, transmit the provider method to the gateway device.

3. The system of claim 2, further comprising a first firewall configured to regulate a communication between the webservice-based interface and the DMZ environment.

4. The system of claim 2, further comprising a second firewall configured to regulate a communication between the DMZ environment and the gateway device.

5. The system of claim 1, wherein the provider method comprises processor-executable instructions to update the incident ticket to provide an indication of a status of work performed relating to the incident.

6. The system of claim 1, wherein the response method comprises processor-executable instructions to provide data indicative of the updated incident ticket.

7. The system of claim 1, wherein the gateway device is further programmed to convert the response method to provide a converted response method, wherein the conversion is based on the structured framework, and wherein the converted response method is executable at the service provider system.

8. The system of claim 1, wherein a webservice-based interface is programmed to provide the converted response method to the service provider system.

9. The system of claim 1, wherein the gateway device is further programmed to authenticate the converted provider method, and wherein the executing the converted provider method comprises transmitting the authenticated converted provider method to a back-end database of the incident management system.

10. The system of claim 9, wherein the gateway device is further programmed to:
    authenticate the provider method with a registry;

retrieve, responsive to the authentication of the provider method, an enterprise URL from a registry and;

transmit, the provider method to the at least one server of the incident management system via the enterprise URL.

11. A method for executing an interaction between a plurality of different service provider system and an incident management system, the method comprising:

using at least one server to:

receive, at the incident management system, data indicative of an incident at an enterprise back-end of the incident management system; and generate an incident ticket corresponding to the incident;

using a webservice-based interface to:

communicate with the plurality of different service provider systems concurrently; and using a gateway device to:

receive a provider method generated at one of the plurality of different service provider system and addressed to the incident management system, the provider method conforming with a set of rules specified for the incident management system and comprising processor-executable instructions to perform a task relating to one or more incidents at an enterprise back-end;

parse the provider method to determine executable code and data structures included therein;

convert the provider method to be compatible with the incident management system, to provide a converted provider method;

wherein the conversion is based on a structured framework to convert a method executable in the service provider system to be processed as a method executable in the incident management system; and wherein the structured framework specifies a conversion protocol transforming and re-formatting of the executable code and the data structures of the provider method to provide a converted provider method executable in the incident management system to generate data output targeted by the provider method; and transmit the converted provider method to the at least one server of the incident management system;

receive a response method from the at least one server of the incident management system; and wherein the at least one server is further used to:

execute the converted provider method to update the incident ticket to provide an updated incident ticket;

generate the response method, wherein the response method when executed provides an indication of the updated incident ticket;

transmit the response method to the gateway device; and wherein the gateway device is further programmed to create a proxy webservice corresponding to each service provider system of the plurality of different service provider systems.

12. The method of claim 11, further comprising using at least one component of a DMZ environment to:

receive, from the webservice-based interface, the provider method;

wherein the webservice-based interface receives the provider method from the service provider system;

authenticate the service provider system transmitting the provider method; and if authenticated, transmit the provider method to the gateway device.

13. The method of claim 12, further comprising using the at least one component of a DMZ environment to provide the converted response method to the service provider system using the webservice-based interface.

14. The method of claim 12, further comprising using a first firewall to regulate a communication between the webservice-based interface and the DMZ environment.

15. The method of claim 12, further comprising using a second firewall to regulate a communication between the DMZ environment and the gateway device.

16. The method of claim 11, further comprising using the gateway device to authenticate the converted provider method, wherein the executing the provider method comprises transmitting the authenticated provider method to a back-end database of the incident management system.

17. The method of claim 11, wherein the provider method comprises processor-executable instructions to perform a task relating to at least one of:

(i) create an incident ticket relating to at least one of the one or more incidents;

(ii) retrieve data indicative of information contained in an existing incident ticket relating to at least one of the one or more incidents;

(iii) update an existing incident ticket, wherein the update provides an indication of a status of work performed relating to at least one of the one or more incidents;

(iv) perform a query relating to at least one of the one or more incidents;

(v) retrieve results of a previous query relating to at least one of the one or more incidents;

(vi) re-assign an incident ticket relating to at least one of the one or more incidents; and (vii) create a work log for an existing incident ticket.

18. The method of claim 17, wherein the response method comprises processor-executable instructions to perform at least one of:

(i) provide an indication of the creation of an incident ticket relating to at least one of the one or more incidents;

(ii) provide data indicative of ticket information in an existing incident ticket relating to at least one of the one or more incidents;

(iii) provide data indicative of updated ticket information indicative of an updated status of an existing incident ticket;

(iv) provide data indicative of results of at least one query relating to at least one of the one or more incidents;

(v) provide an indication of a re-assignment of an incident ticket relating to at least one of the one or more incidents; and (vii) provide an indication of the creation of a work log for an existing incident ticket.

19. The method of claim 11, further comprising using the gateway device to convert the response method to provide a converted response method, wherein the conversion is based on the structured framework, and wherein the converted response method is readable at the service provider system.

20. The method of claim 16, further comprising using the gateway device to:

authenticate the provider method with a registry;

retrieve, responsive to the authentication of the provider method, an enterprise URL from a registry and;

transmit, the provider method to the at least one server of the incident management system via the enterprise URL.

21. A non-transitory computer readable medium storing instructions executable by a processing device, wherein execution of the instructions causes the processing device to implement a method of executing an interaction between a plurality of different service provider system and an incident management system, the method comprising:
  using at least one server to:
    receive, at the incident management system, data indicative of an incident at an enterprise back-end of the incident management system; and
    generate an incident ticket corresponding to the incident;
  using a webservice-based interface to:
    communicate with the plurality of different service provider systems concurrently; and
  using a gateway device to:
    receive a provider method generated at one of the plurality of different service provider system and addressed to the incident management system, the provider method conforming with a set of rules specified for the incident management system and comprising processor-executable instructions to perform a task relating to one or more incidents at an enterprise back-end;
    parse the provider method to determine executable code and data structures included therein;
    convert the provider method to be compatible with the incident management system, to provide a converted provider method;
    wherein the conversion is based on a structured framework to convert a method executable in the service provider system to be processed as a method executable in the incident management system; and
    wherein the structured framework specifies a conversion protocol transforming and re-formatting of the executable code and the data structures of the provider method to provide a converted provider method executable in the incident management system to generate data output targeted by the provider method; and
    transmit the converted provider method to the at least one server of the incident management system;
      receive a response method from the at least one server of the incident management system; and
    wherein the at least one server is further used to:
  execute the converted provider method to update the incident ticket to provide an updated incident ticket;
  generate the response method, wherein the response method when executed provides an indication of the updated incident ticket;
  transmit the response method to the gateway device; and
  wherein the gateway device is further programmed to create a proxy webservice corresponding to each service provider system of the plurality of different service provider systems.

* * * * *